United States Patent
Ting

(10) Patent No.: US 8,305,720 B2
(45) Date of Patent: Nov. 6, 2012

(54) LATCH-CONTROL PROTECTION CIRCUIT

(75) Inventor: Ming Chiang Ting, Hsinchu (TW)

(73) Assignee: Analog Vision Technology Inc., Taipei County (TW)

( * ) Notice: Subject to any disclaimer, the term of this patent is extended or adjusted under 35 U.S.C. 154(b) by 186 days.

(21) Appl. No.: 12/876,364

(22) Filed: Sep. 7, 2010

(65) Prior Publication Data

US 2011/0110007 A1    May 12, 2011

(30) Foreign Application Priority Data

Nov. 6, 2009  (TW) ................................ 98137671 A
Jul. 12, 2010  (TW) ................................ 99122889 A

(51) Int. Cl.
    *H02H 3/20*     (2006.01)
    *H02H 9/04*     (2006.01)

(52) U.S. Cl. .............. 361/56; 361/79; 361/91.1; 361/95

(58) Field of Classification Search ............... 361/56, 361/79, 91.1, 95
See application file for complete search history.

(56) References Cited

U.S. PATENT DOCUMENTS

| 4,330,816 | A | * | 5/1982 | Imazeki et al. | 363/21.05 |
| 4,926,283 | A | * | 5/1990 | Qualich | 361/103 |
| 5,914,663 | A | * | 6/1999 | Whitehead | 340/638 |
| 6,329,777 | B1 | * | 12/2001 | Itabashi et al. | 318/434 |
| 6,556,405 | B2 | * | 4/2003 | Sudou et al. | 361/93.7 |
| 7,106,566 | B2 | * | 9/2006 | Liu et al. | 361/90 |

* cited by examiner

*Primary Examiner* — Rexford Barnie
*Assistant Examiner* — Zeev V Kitov
(74) *Attorney, Agent, or Firm* — Rosenberg, Klein & Lee

(57) ABSTRACT

A latch-control protection circuit applied in a power converter is provided. The protection circuit has a comparing circuit unit and a logic gate. The comparing circuit unit is utilized to selectively output a default signal or a comparing signal according to a state signal from the logic gate, wherein the default signal is utilized for latching the state signal and the comparing signal is corresponded to the power condition of the power converter. The logic gate generates the state signal according to the output signal of the comparing circuit unit and a system judging signal. The output signal may be the default signal or the comparing signal. The system judging signal indicates the condition of the power converter.

25 Claims, 5 Drawing Sheets

LATCH-CONTROL PROTECTION CIRCUIT

BACKGROUND OF THE INVENTION (1) Field of the Invention

This invention relates to a protection circuit, and more particularly relates to a latch-control protection circuit.

(2) Description of the Prior Art

To prevent over-voltage, over-current, or other abnormal conditions from damaging the power converter and the load circuit, a protection circuit is usually used to restrict the level of the output voltage, the amount of the output current, or the operating temperature until the abnormal condition is passed away.

Take an over-voltage protection circuit for example, when the output voltage of the power converter detected by the over-voltage protection circuit is too high, the over-voltage protection circuit stops power supplied to the power converter or alters the power supply of the power converter to low-voltage one. Meanwhile, a silicon controlled rectifier (SCR) unit is usually demanded for the protection circuit to enable latch operation. That is, when an over-voltage condition is detected, the over-voltage protection circuit turns into the over-voltage protection mode. The over-voltage protection circuit should be kept at the over-voltage protection mode by using the SCR unit until the output voltage returned to normal.

FIG. 1 is a circuit diagram of a typical SCR unit 10 and the peripheral circuit. As shown, the SCR unit 10 is connected to a delay circuit 12, which is composed of a resistor R3 and a capacitor C1. A protecting event detecting signal DET received by the delay circuit 12 is utilized to turn on the switch Q1 to pull down the state signal STATE to the ground VSS. The state signal STATE is utilized to activate a judging circuit (not shown) to enable the protecting operation. After the protecting operation is enabled, the judging circuit would be latched by the grounded state signal STATE unless a bias signal VBIAS is generated to reset the SCR unit 10.

However, the usage of SCR unit 10 in the latch-control protection circuit has the following drawbacks. Firstly, the SCR unit 10 is expensive and the parameters thereof are hard to be precisely controlled by using the ordinary semiconductor fabrication process. In addition, the delay circuit 12 integrated to the SCR unit 10 usually needs a greater time constant to prevent misjudging for happening. Such drawbacks restrict the application of the protection circuit and increase the overall cost.

SUMMARY OF THE INVENTION

Accordingly, it is an object of the present invention to provide a latch-control protection circuit, which does not need the SCR unit and the related circuit.

To achieve the above mention object, a latch-control protection circuit for a circuit system is provided. The latch-control protection circuit has a comparing unit and a logic gate. The comparing unit is utilized to selectively output a default signal or a comparing signal according to a state signal, wherein the default signal is utilized to latch the state signal and the comparing signal is corresponded to a protecting event. The logic gate is utilized to generate the state signal according to an output signal of the comparing unit, which may be the default signal or the comparing signal, and a system judging signal corresponded to an operation mode of the circuit system.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The spirit of the present invention is to use two different input signals to enable the comparing unit selectively outputting a default signal for latching the protection condition or a comparing signal corresponding to the operation mode of the circuit system to be protected according to the state of the circuit system, such as over-voltage state, over-current state, over-heat state, and etc.

Figure 2:
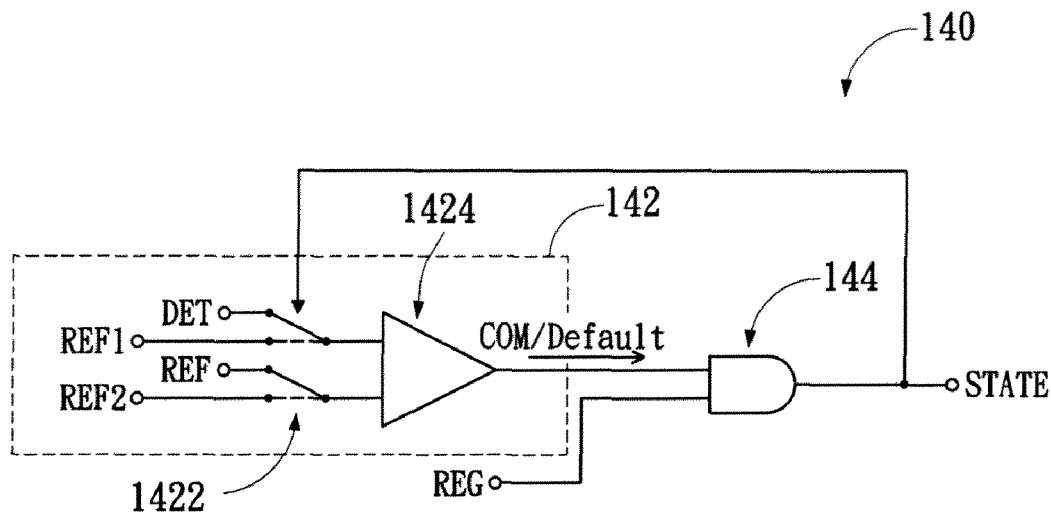
FIG. 2 is a schematic view of a protection circuit in accordance with a preferred embodiment of the present invention.
Figure 2A:
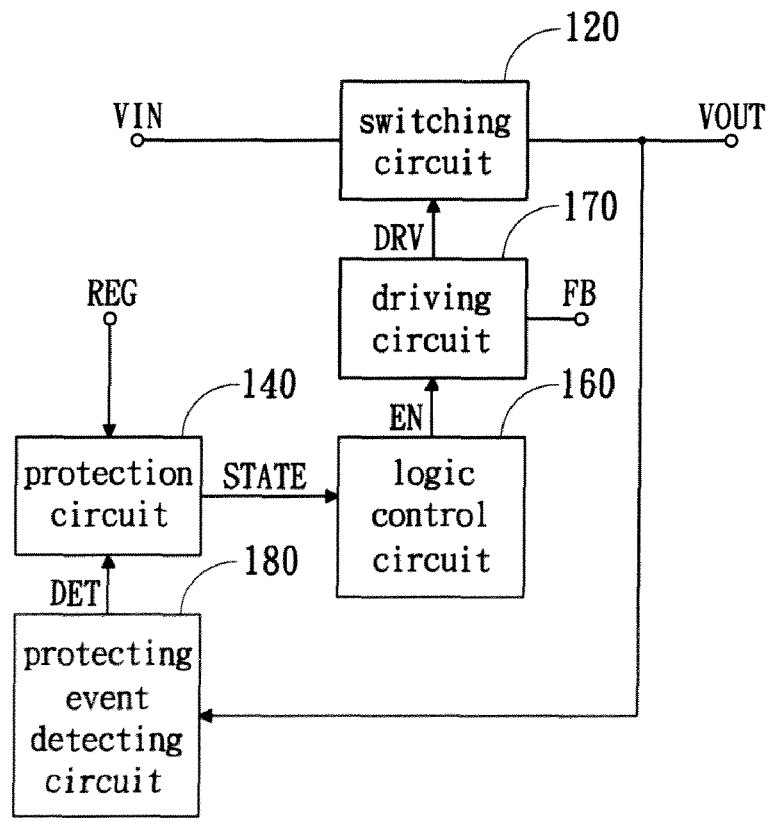
FIG. 2A is a block diagram showing the protection circuit of FIG. 2 adapted in a circuit system in accordance with a preferred embodiment of the present invention.
Figure 3:
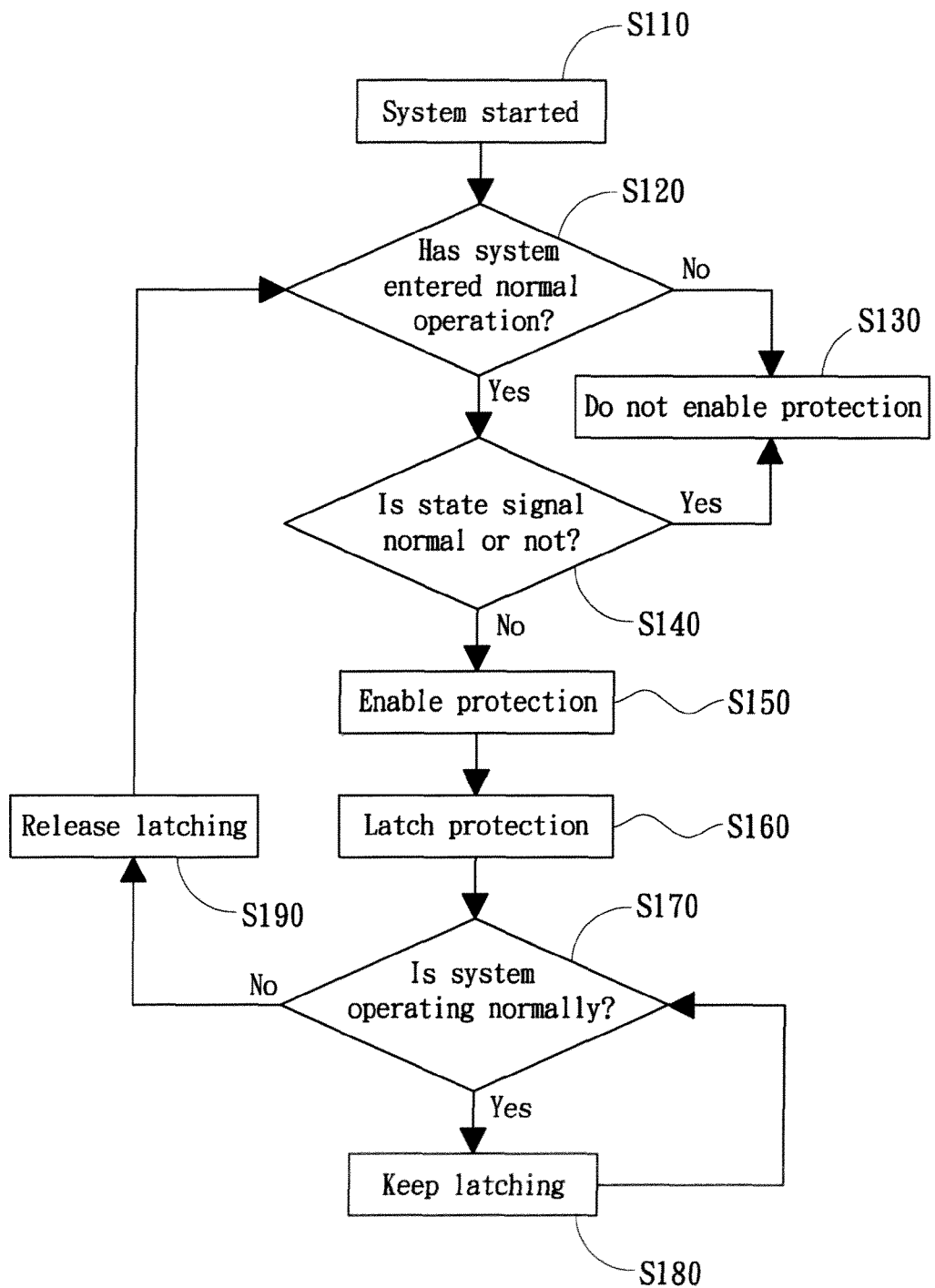
FIG. 3 is a flow chart showing the operation method of the protection circuit of FIG. 2.

FIG. 2 is a schematic view of a protection circuit in accordance with a preferred embodiment of the present invention, FIG. 2A is a block diagram showing the protection circuit of FIG. 2 adapted in a circuit system (power converter) in accordance with a preferred embodiment of the present invention, and FIG. 3 is a flow-chart showing the operation method of the protection circuit.

As shown in FIG. 2, the protection circuit 140 has a comparing unit 142 and a logic gate 144. The comparing unit 142 is able to selectively output a default signal Default or a comparing signal COM according to a state signal STATE. The default signal Default is utilized to latch the state signal STATE and the comparing signal COM is respective to a protecting event, such as over-voltage, over-current, or over-heat.

For example, as the protection circuit 140 is adapted to over-voltage protection, the detecting signal DET may be in related with the output voltage or the input voltage of the circuit system (not shown) to be protected. That is, the detecting signal DET should be able to represent the condition of the output voltage or the input voltage of the circuit system to be protected such that the comparing signal COM respective to over-voltage protection condition can be determined.

The state signal STATE should be able to indicate at least a normal state and an abnormal state. For example, the digital signal 0 and 1 can be used to represent the normal state and the abnormal state respectively. When the state signal STATE shows the normal state, the comparing unit 142 outputs the comparing signal COM. When the state signal STATE shows the abnormal state, the comparing unit 142 outputs the default signal Default to latch the state signal STATE in the abnormal state.

In the present embodiment, the comparing unit 142 has an input switching unit 1422 and a comparator 1424. The input switching unit 1422 is able to selectively input a first input signal set or a second input signal set to the comparator 1424 according to the condition of the state signal STATE. For example, when the state signal STATE shows a normal state, the input switching unit 1422 selectively inputs the first input signal set to the comparator 1424. When the state signal STATE shows an abnormal state, the input switching unit 1422 selectively inputs the second input signal set to the comparator 1424 to latch a level of the state signal STATE.

The first input signal set includes a reference signal REF and the above mentioned detecting signal DET. The comparator 1424 may generate the comparing signal COM when receiving the first input signal set. The second input signal set includes a first reference signal REF1 and a second reference signal REF2, and the voltage level of the first reference signal REF1 is kept higher than that of the second reference signal REF2. The comparator 1424 may generate the default signal Default, which is irrelevant to the detecting signal DET, when the second input signal set is received.

The logic gate 144 generates the state signal STATE according to the output signal of the comparing unit 142 and a system judging signal REG. The system judging signal REG is utilized to indicate the operation mode of the circuit system to prevent the detecting signal DET from misjudging the protecting event. As an embodiment, the system judging signal should be able to show at least a normal operation mode and a start-up mode. The protection circuit 140 needs to enable the protection function only in the normal operation mode.

When the system judging signal REG shows that the circuit system is under normal operation mode, the state signal STATE generated by the logic gate 144 is decided by the output signal of the comparing unit 142. At this time, when the comparing unit 142 generates the output signal according to the first input signal set, the comparing signal COM is outputted and the state signal STATE generated by the logic gate 144 may show the normal state or the abnormal state according to the level of the comparing signal COM. However, when the comparing unit 142 generates the output signal according to the second input signal set, the default signal Default is outputted and the state signal STATE would be latched in the abnormal state to continue the protecting operation. In contrast, when the system judging signal REG shows that the circuit system is under start-up mode, the state signal STATE generated by the logic gate 144 would be restricted to the normal state no matter what the output signal of the comparing unit 142 is.

The logic gate 144 may be an AND gate for example, which generates high-level state signal STATE only when the system judging signal REG is high and the output signal of the comparing unit 142 is high. As a preferred embodiment, the high-level system judging signal REG may be defined as corresponding to the normal operation mode and the low-level one being defined as corresponding to the start-up mode. The high-level state signal STATE may be defined as corresponding to the abnormal state and the low-level one being defined as corresponding to the normal state. When the first input signal set is selected, the output signal of the comparing unit 142 is a high-level comparing signal COM to show that the system circuit has abnormal condition or a low-level comparing signal COM to show that the system circuit operates normally. In contrast, when the second input signal set is selected, only the high-level default signal Default is outputted.

The protection circuit in accordance with the present invention can be applied not only to over-voltage protection but also to other circuit protection demands, such as over-current protection, over-heat protection, etc. That is, the protection circuit provided in the present invention can be applied to various protecting events with a proper detecting signal DET for detecting the protecting event being provided and a suitable operational mode for such protecting event being defined by using the system judging signal REG.

FIG. 2A is a block diagram showing the protection circuit 140 applied in a circuit system in accordance with a preferred embodiment of the present invention. As shown, the circuit system, such as a power converter, has a logic control circuit 160 and a driving circuit 170. The logic control circuit 160 is utilized to receive the state signal STATE from the protection circuit 140 and generate an enable signal EN accordingly to start or stop the operation of the driving circuit 170. The driving circuit 170 is utilized to generate the driving voltage signal DRV according to a feedback signal FB so as to control the duty cycle of the switching circuit 120 to achieve the object of adjusting the level of the output voltage VOUT. When the state signal STATE shows the over-voltage state, the enable signal EN stops the operation of the driving circuit 170, whereas, when the state signal STATE shows the normal state, the driving circuit 170 keeps operating. The circuit system also has a protecting event detecting circuit 180 for sensing the protecting event and generating the detecting signal DET accordingly. The detecting signal DET is decided according to the protection function to be demonstrated. For example, when over-current protection is to be provided, the protecting event detecting circuit 180 may detect the current passing through the switching circuit 120 as the protecting event; when over-voltage protection function is to be provided, the protecting event detecting circuit 180 may detect the input/output voltage of the driving circuit 170 as the protecting event; when over-heat protection function is to be provided, the protecting event detecting circuit 180 may detect the operational temperature of the circuit system as the protecting event.

The system judging signal REG utilized for resetting the protection circuit 140 is decided according to the actual need. For example, the system judging signal REG may be generated according to the input voltage VIN of the circuit system, such as a power-on reset signal, or the system judging signal REG may be generated according to the first side current of the circuit system, such as an over-current detecting signal.

FIG. 3 is a flow chart showing the operation method of the protection circuit 140 of FIG. 2. As shown in steps S110 and S120, after the circuit system is started, the circuit system may successfully enter the normal operation mode or stay in the start-up mode. When the circuit system is operated in the start-up mode, the system judging signal REG would be 0 (the low-level signal). At this time, the protection circuit 140 would not enable the protection function as shown in step S130.

On the other hand, when the circuit system is operated in the normal operation mode, the system judging signal REG would be 1 (the high-level signal). At this time, as shown in step S140, the protection circuit 140 may judge whether the protection function should be enabled or not according to the state signal STATE. That is, when the state signal STATE is 0 to show that the circuit system is normally operated, the protection function is not enabled as shown in step S130. When the state signal STATE is 1 to show that the circuit system has abnormal conditions, the protection function is enabled as shown in step S150.

When the state signal STATE shows the abnormal condition, as shown in step S160 and FIG. 2A, the comparing unit 142 selects the second input signal set and the high-level default signal Default is generated to latch the state signal STATE at high level. Thereby, the condition of the protection circuit 140 would be latched and the protection function continues.

After the protection circuit 140 is latched in the protection condition, referring to step S170 and FIG. 2A, the state signal STATE would not return to the normal state even when the voltage level of the detecting signal DET is reduced. At this time, the protection circuit 140 decides whether the protection condition continues or not according to the system judging signal REG. In detail, when the system judging signal REG is 1 to show that the circuit system is normally operated, as shown in step S180, the high-level state signal STATE remained to keep latching the protection condition. In contrast, when the system judging signal is 0 to show that the circuit system has entered the start-up mode, as shown in step S190, the low-level state signal STATE is generated to release latching of the protection circuit 140.

Figure 1:
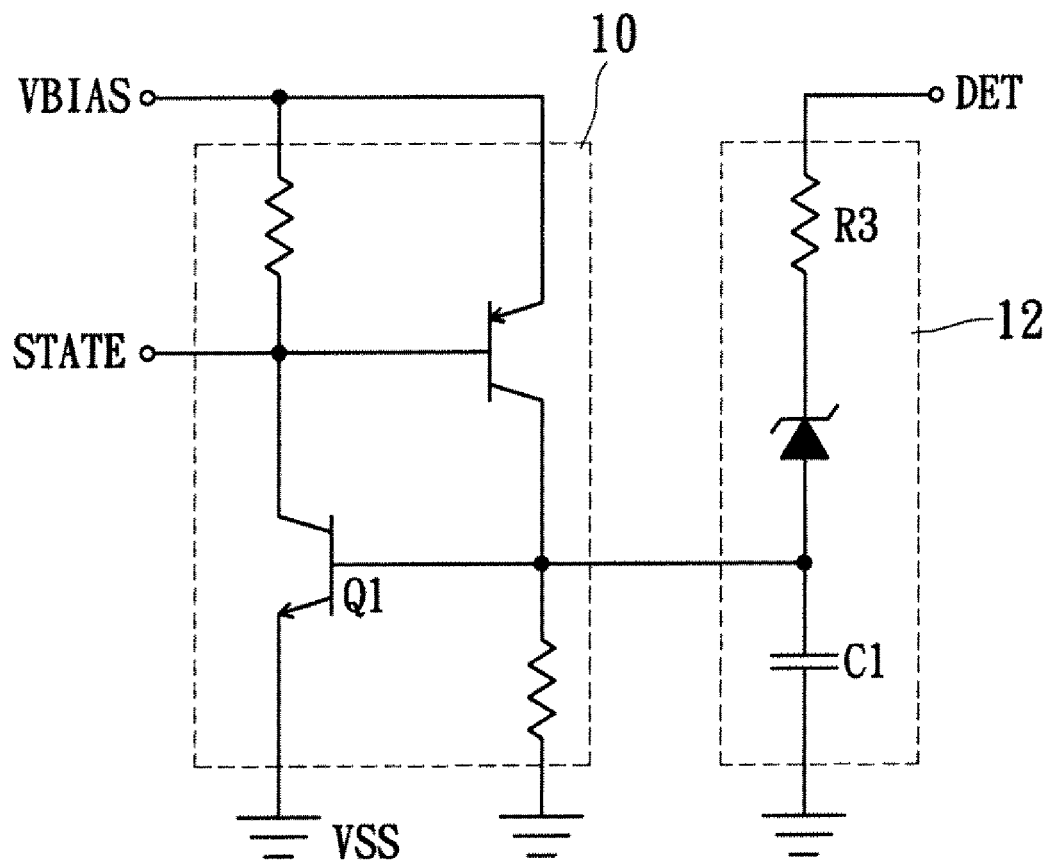
FIG. 1 is a circuit diagram of a typical latch-control protection circuit.

In contrast with the traditional latch-control protection circuit as shown in FIG. 1, the protection circuit 140 provided in the present invention enables latch control without the need of the SCR unit 10 and the delay circuit 12. Thus, the cost can be reduced and the unwanted limitations due to the usage of the SCR unit 10 can be prevented.

Figure 4:
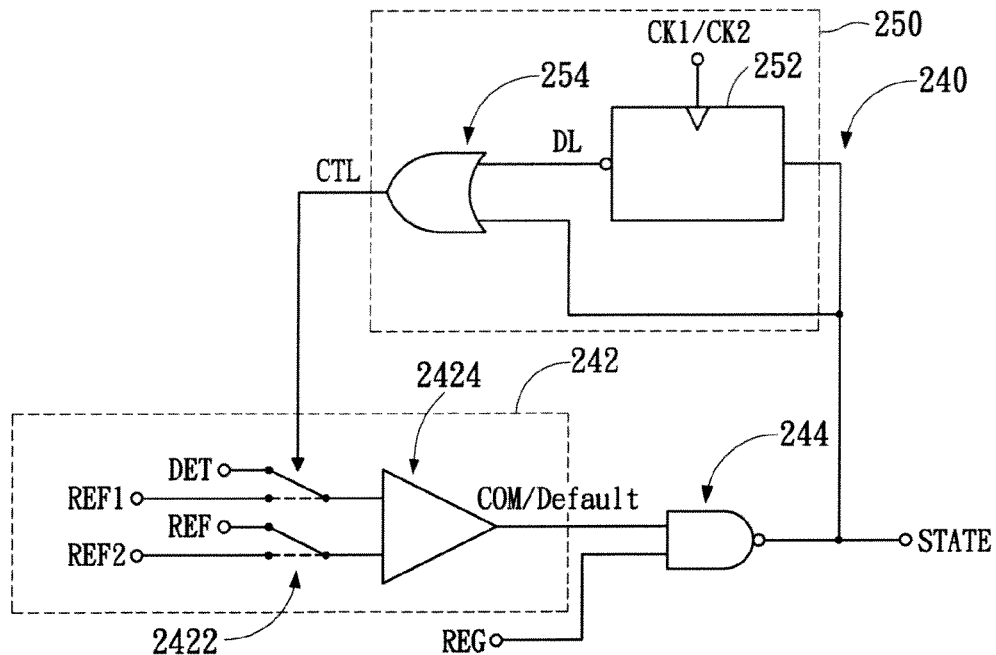
FIG. 4 is a schematic view of a protection circuit in accordance with another embodiment of the present invention.

FIG. 4 is a schematic view of a protection circuit featuring auto-recovery ability in accordance with another embodiment of the present invention. As shown, the protection circuit has a comparing unit 242, a logic gate 244, and an auto-recovery unit 250. The functions of the comparing unit 242 and the logic gate 244 are similar to that of the embodiment as shown in FIG. 2 and thus are not repeated here.

The type of the logic gate 244 applied in the present embodiment is different from that of FIG. 2. The logic gate 244 of the present embodiment is a NA gate rather than an AND gate 124 as shown in FIG. 2. However, the role of the NAND gate 244 in the protection circuit, which is utilized for integrating the output signal of the comparing unit 142 and the system judging signal REG so as prevent a wrong detecting signal DET, is identical to that of the AND gate 124 in FIG. 2. The present embodiment applies the NAND gate 244 rather than the AND gate 124 is because that the character of the state signal STATE in the present embodiment is different from that of the embodiment as shown in FIG. 2. In detail, the state signal STATE in FIG. 2 indicates the normal state when it shows a low level, however, the state signal STATE in the present embodiment indicates the normal state when it shows a high level. The high level state signal STATE in accordance with the present embodiment can be utilized as an output control signal for enabling the circuit system.

The auto-recovery unit 250 has a timing circuit 252 and a second logic gate 254. In the present embodiment, the timing circuit 252 is a dual clock timer, which is capable of setting two independent time lengths, the first predetermined time T1 and the second predetermined time T2. Also referring to FIG. 5, the timing circuit 252 begins counting the first predetermined time T1 when the state signal STATE is transformed from the high level (or 1), which indicates the normal state, to the low level (or 0), which indicates the abnormal state. After the end of the first predetermined time T1, a delayed state signal DL is generated. In addition, the timing circuit 252 begins counting the second predetermined time T2 when the state signal STATE is transformed from the low level (or 0), which indicates the abnormal state, to the high level (or 1), which indicates the normal state. The delayed state signal DL would be terminated right after the end of the second predetermined time T2.

The second logic gate 254 receives the state signal STATE and the above mentioned delayed state signal DL and generates a latch control signal CTL accordingly. The comparing unit 242 outputs the comparing signal COM or the default signal Default according to the latch control signal CTL.

Figure 5:
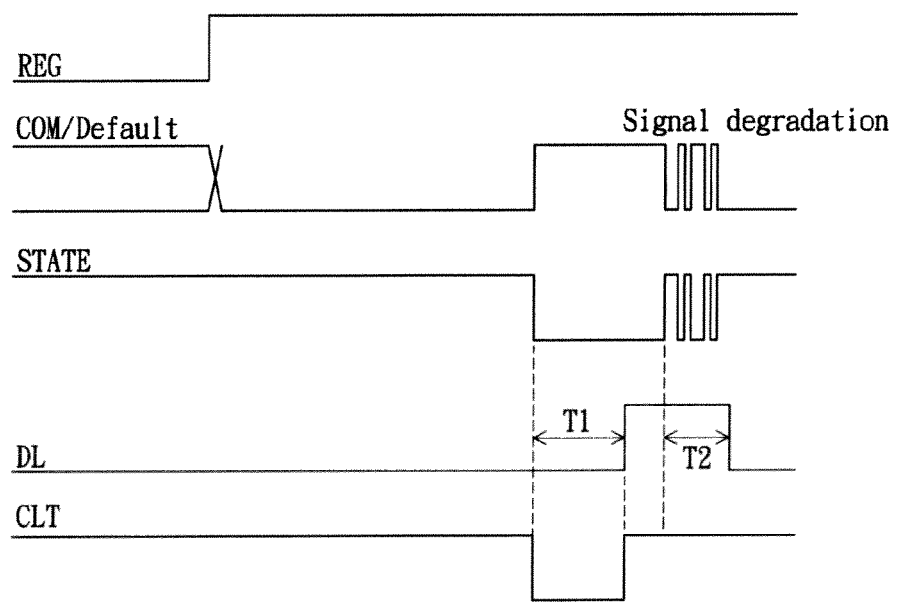
FIG. 5 is a diagram showing the waveforms of signals indicated in the protection circuit of FIG. 4.

In the present embodiment, the delayed state signal DL outputted by the timing circuit 252 is a reversed and delayed signal of the state signal STATE. In addition, an OR gate 254 is used for generating the above mentioned latch control signal CTL. As shown in FIG. 5, when something abnormal happens in the circuit system, the state signal STATE would be transformed from the high level to the low level, but the delayed state signal DL remains at the low level. At this time, the latch control signal CTL would be transformed from the original high level to the low level, and the latch control for the protection circuit begins. When the latch control signal CTL is of the low level, the comparing unit 242 selects the second input signal set, which includes the first reference signal REF1 and the second reference signal REF2, and outputs the default signal Default accordingly.

Afterward, after the end of the first predetermined time T1, the delayed state signal DL is transformed from the original low level to the high level. At this time, the low level latch control signal CTL outputted by the OR gate 254 would be transformed to the high level automatically and the latch period is terminated. When the latch control signal CTL is of the high level, the comparing unit 242 selects the first input signal set, which includes the reference signal REF and the detecting signal DET, and outputs the comparing signal COM accordingly.

Thereafter, as the comparing unit 242 senses that the circuit system back to normal, the comparing signal COM would be transformed from the high level to the low level. Meanwhile, the state signal STATE would be transformed from the low level to the high level. The timing circuit 252 begins counting the second predetermined time T2 when sensing the variation of the state signal STATE. The timing circuit 252 has the high level delayed state signal DL back to the original low level after the end of the second predetermined time T2. During the second predetermined time T2, the de-latch condition is latched to prevent the OR gate 254 from outputting low level latch control signal CTL to restart latch control. That is, the second predetermined time T2 is utilized as a blank time after the state signal STATE has been transformed from the low level to the high level for preventing noise of the state signal STATE, such as the noise due to signal degradation, from being misjudged by the comparing unit 242.

In the embodiment as shown in FIG. 5, the state signal STATE is transformed from the low level to the high level after the latch control signal CTL has returned the high level. This is the case that the circuit system returns to the normal state after the latch period is ended. However, if the system returns to the normal state during the latch period, the comparing unit 242 controlled by the latch control signal CTL may still output the high level default signal Default. The output of the comparing unit 242 would be switched to the low level comparing signal COM until the first predetermined time T1 is ended, and after then, the state signal STATE would be transformed from the low level to the high level.

In the present embodiment, the timing circuit 252 generates two independent time period T1 and T2 to meet the need of various protection issues. For example, for the demand of over-current protection, a larger first predetermined time T1 is demanded but the second predetermined time T2 can be short. However, the present invention is not so restricted. There can be only one predetermined time period being set by the timing circuit 252 in accordance with the present invention. The only predetermined time period can be used for setting both the first predetermined time T1 and the second predetermined time T2, or merely for setting the first predetermined time T1 with zero second predetermined time T2.

Figure 6:
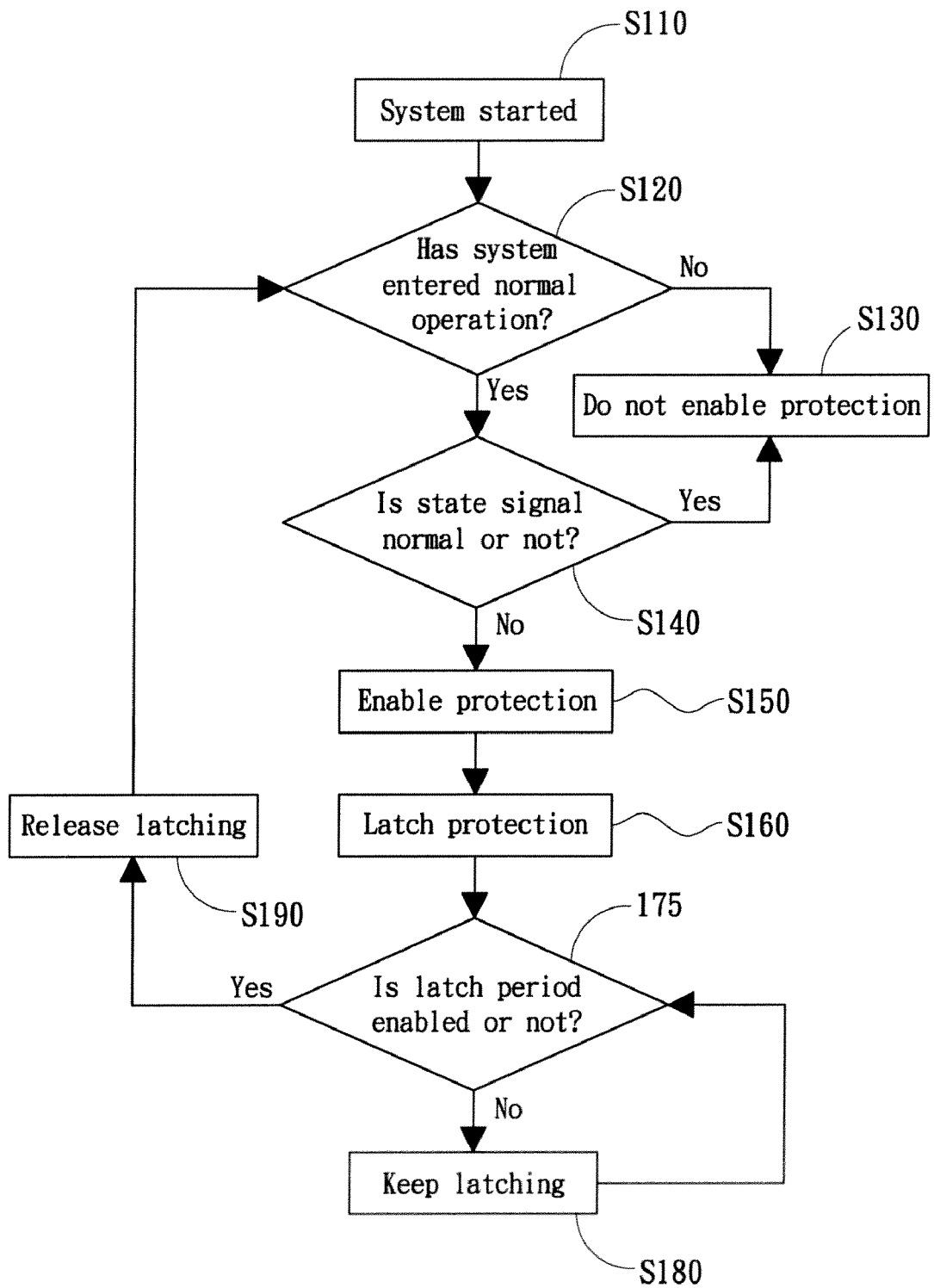
FIG. 6 is a flow chart showing the operation method of the protection circuit of FIG. 4.

FIG. 6 is a flow chart showing the operation method of the protection circuit of FIG. 4. The differences between the present embodiment and the embodiment of FIG. 3 are described below.

Referring to step S175 and FIG. 4, after the protection circuit 240 is latched in the protection state, the state signal STATE would not return to the condition of normal state even when the level of the detecting signal DET is decreased. At this time, as shown in step S175, the output of the comparing unit 242 is decided by judging whether the latch period is ended or not. When the latch control signal CTL is shifted from the low level to the high level, the latch period is ended and the output of the comparing unit 242 is altered to the comparing signal COM.

When the output of the comparing unit 242 is the default signal Default, the state signal STATE from the logic gate 244 is low even if the system judging signal REG is high to indicate that the circuit system is under normal operation mode. That is, the protection circuit 240 would be latched at the protection state continuously. On the other hand, when the output of the comparing unit 242 is altered to the comparing signal COM, the state signal STATE would be controlled by the level of the comparing signal COM.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A latch-control protection circuit, which is adapted in a circuit system, comprises:
   a comparing unit, utilized for selectively outputting a default signal or a comparing signal according to a state signal, wherein the default signal is utilized for latching the state signal and the comparing signal is corresponded to a protecting event; and
   a logic gate, utilized for generating the state signal to an input of the comparing unit according to an output signal of the comparing unit and a system judging signal corresponding to an operational mode of the circuit system, wherein the output signal is the default signal or the comparing signal;
   wherein the comparing unit has an input switching unit and a comparator, the input switching unit selectively inputs a first input signal set or a second input signal set to the comparator according to the state signal, the first input signal set is corresponded to the comparing signal, and the second input signal set is corresponded to the default signal.

2. The protection circuit of claim 1, wherein the first input signal set includes a reference signal and a detecting signal, which represents the protecting event, the second input signal set includes a first reference signal and a second reference signal, and a voltage level of the first reference signal is higher than that of the second reference signal.

3. The protection circuit of claim 1, wherein the protecting event is an output voltage or an input voltage of the circuit system.

4. The protection circuit of claim 1, wherein the protecting event is an output current or an input current of the circuit system.

5. The protection circuit of claim 1, wherein the protecting event is an environmental temperature of the circuit system.

6. The protection circuit of claim 1, wherein the system judging signal is a power-on reset signal.

7. The protection circuit of claim 1, wherein the state signal has at least a normal state and an abnormal state.

8. The protection circuit of claim 7, wherein the system judging signal has at least a normal operation mode and a start-up mode.

9. The protection circuit of claim 8, wherein as the system judging signal shows the normal operation mode, the state signal generated by the logic gate is decided by the output signal of the comparing unit.

10. The protection circuit of claim 8, wherein as the system judging signal shows the start-up mode, the state signal generated by the logic signal shows the normal state.

11. The protection circuit of claim 7, wherein as the state signal shows the normal state, the comparing unit outputs the comparing signal.

12. The protection circuit of claim 7, wherein as the state signal shows the abnormal state, the comparing unit outputs the default signal to latch a level of the state signal.

13. The protection circuit of claim 1, wherein as the state signal shows a normal state, the input switching unit selectively inputs the first input signal set to the comparator.

14. The protection circuit of claim 1, wherein as the state signal shows an abnormal state, the input switching unit selectively inputs the second input signal set to the comparator to latch a level of the state signal.

15. The protection circuit of claim 8, wherein as the comparing unit outputs the default signal and the system judging signal shows the normal operation mode, the state signal generated by the logic gate shows the abnormal state.

16. The protection circuit of claim 1, wherein the logic gate is an AND gate.

17. The protection circuit of claim 1, wherein the state signal is utilized to enable a protecting operation.

18. The protection circuit of claim 17, wherein the protecting operation is an over-voltage protecting operation, an over-current protecting operation, or an over-heated protecting operation.

19. The protection circuit of claim 1, further comprising an auto-recovery unit, which generates a latch control signal for controlling the comparing unit to output the default signal according to the state signal, and the latch control signal lasting a first predetermined time.

20. The protection circuit of claim 19, wherein the auto-recovery unit has a timing circuit for setting the first predetermined time.

21. The protection circuit of claim 20, wherein the timing circuit is utilized for setting the first predetermined time and the second predetermined time, wherein the second predetermined time is utilized for setting a blank time to prevent noise of the state signal from being misjudged by the comparing unit.

22. The protection circuit of claim 21, wherein the timing circuit begins counting the first predetermined time when the state signal is transformed to a condition indicating an abnormal state, and the timing circuit begins counting the second predetermined time when the state signal is transformed to a condition indicating the normal state.

23. The protection circuit of claim 19, wherein the auto-recovery unit has a timing circuit and a logic gate, the timing circuit receives the state signal and outputs a delayed state signal accordingly, the logic gate receives the state signal and the delayed state signal and outputs the latch control signal accordingly.

24. The protection circuit of claim 23, wherein the delayed state signal is a reversed and delayed signal of the state signal, and the logic gate is an OR gate.

25. The protection circuit of claim 23, wherein the timing circuit is a dual clock timer.

* * * * *